UNITED STATES PATENT OFFICE.

CHARLES HERBERT ROBINSON, OF PHILADELPHIA, PENNSYLVANIA, ASSIGNOR TO HIMSELF AND GEORGE T. LEWIS, OF SAME PLACE.

OXIDIZED LINSEED-OIL.

SPECIFICATION forming part of Letters Patent No. 414,724, dated November 12, 1889.

Application filed February 9, 1889. Serial No. 299,325. (No specimens.)

*To all whom it may concern:*

Be it known that I, CHARLES HERBERT ROBINSON, of the city and county of Philadelphia, State of Pennsylvania, have invented a new and useful Improved Preparation of Linseed-Oil, of which the following is a true and exact description.

My invention relates to linseed-oil, and has for its object to provide a preparation of the same which will be in such a condition that it can be expeditiously thickened to any desired degree by heating it to a high temperature and maintaining it at such high temperature until the desired degree of thickness is secured.

In an application filed by me on the 16th day of January, 1889, and bearing the Serial No. 296,558, and in another application filed February 9, 1889, Serial No. 299,324, I have described my discovery of the fact that by mixing raw linseed-oil and a portion of thickened linseed-oil in the condition of a gummy mass (generally called in the trade "oxidized oil") and subjecting the mixture to heat the entire mass will be thickened, the degree of thickness and the rapidity of the thickening depending on the conditions under which the treatment is effected, the best results being obtained by mixing the raw and thickened oil and heating it to a temperature below that at which gases are rapidly driven off from the thickened oil until the thickened oil is entirely dissolved and then heating the resultant mixture to a high temperature, preferably from 600° to 630° Fahrenheit, to effect the desired thickening of the oil, the process of dissolving the thickened oil in the raw oil being preferably carried on at a temperature of about 350° Fahrenheit, for the reason that at that temperature the thickened oil dissolves readily without throwing off gases, and but little loss is met with through the evaporation of the oil, which at higher temperatures is quite considerable.

The preparation of oil resulting from dissolving the thickened oil in the raw oil, as above described, is itself a valuable product, adapted to be manufactured in large quantities and sold to the consumers of linseed-oil, who can bring it to the desired degree of thickness by heating it to such temperature and to such length of time as will give the results best adapted for their use.

My new preparation of linseed-oil differs from the ordinary thickened oil produced by boiling in that by subsequent treatment at a high heat it will increase in thickness with great rapidity and solidify without any very considerable loss by evaporation and without requiring subsequent exposure to the air in the manner ordinarily used for preparing linseed-oil for the manufacture of linoleum, which is not the case with the oils of the same viscidity made by any other known process.

Having now described my invention, what I claim as new, and desire to secure by Letters Patent, is—

As a new article of manufacture, a solution in raw linseed-oil of linseed-oil solidified by oxidation, substantially as described.

CHARLES HERBERT ROBINSON.

Witnesses:
LEWIS R. DICK,
FRANCIS T. CHAMBERS.